Dec. 18, 1934.  G. C. JETT  1,984,876
TRAILER DUMP MECHANISM
Filed March 19, 1930  4 Sheets-Sheet 4

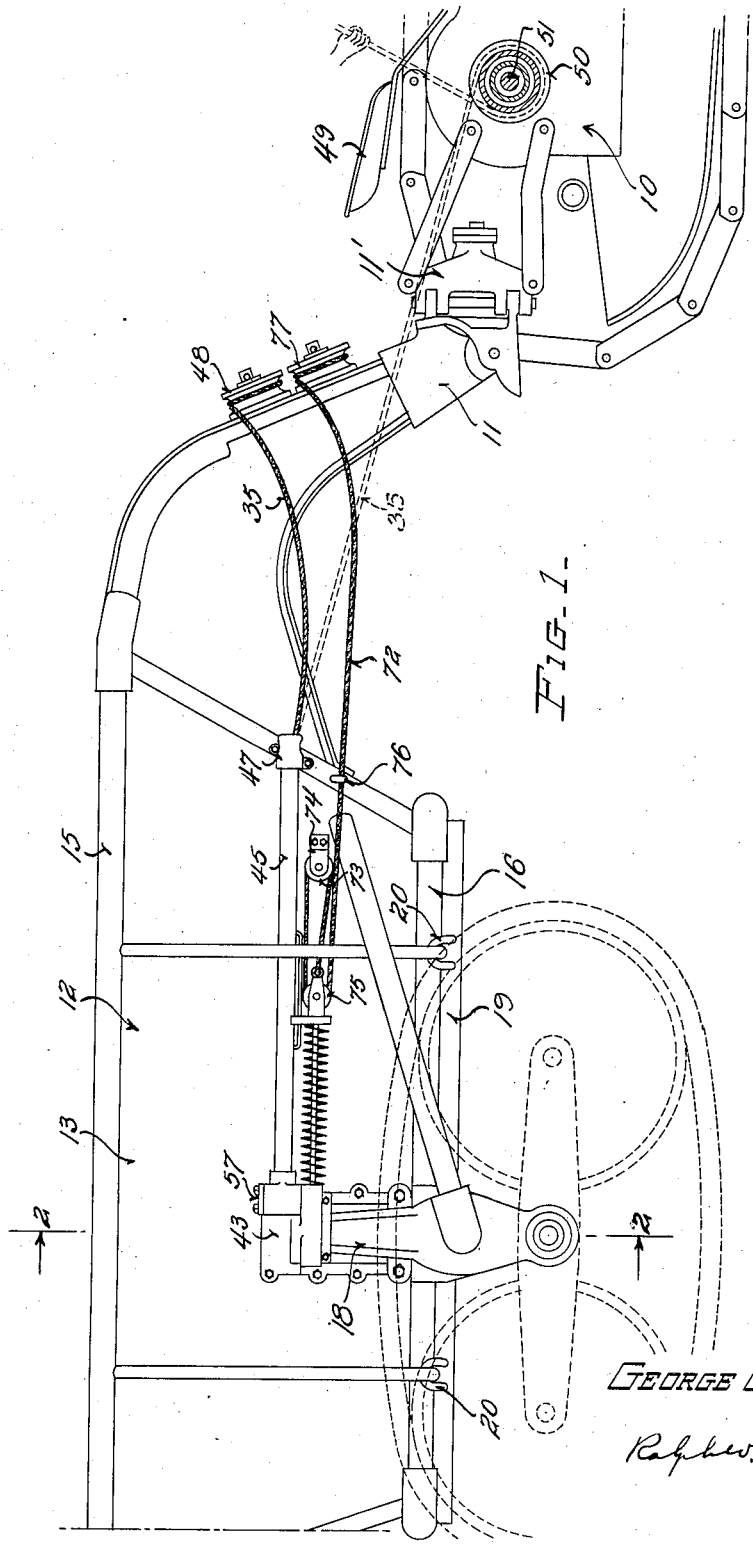

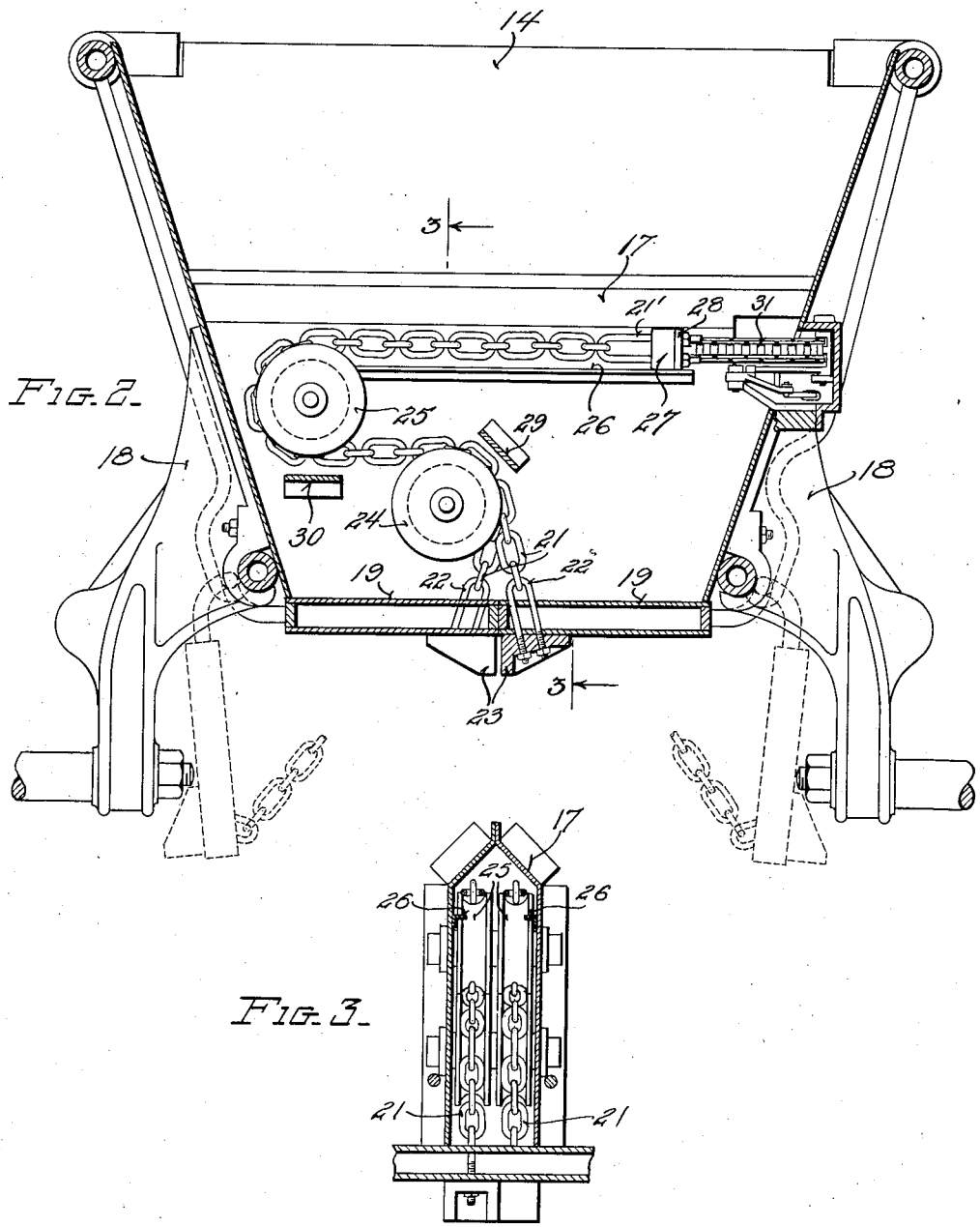

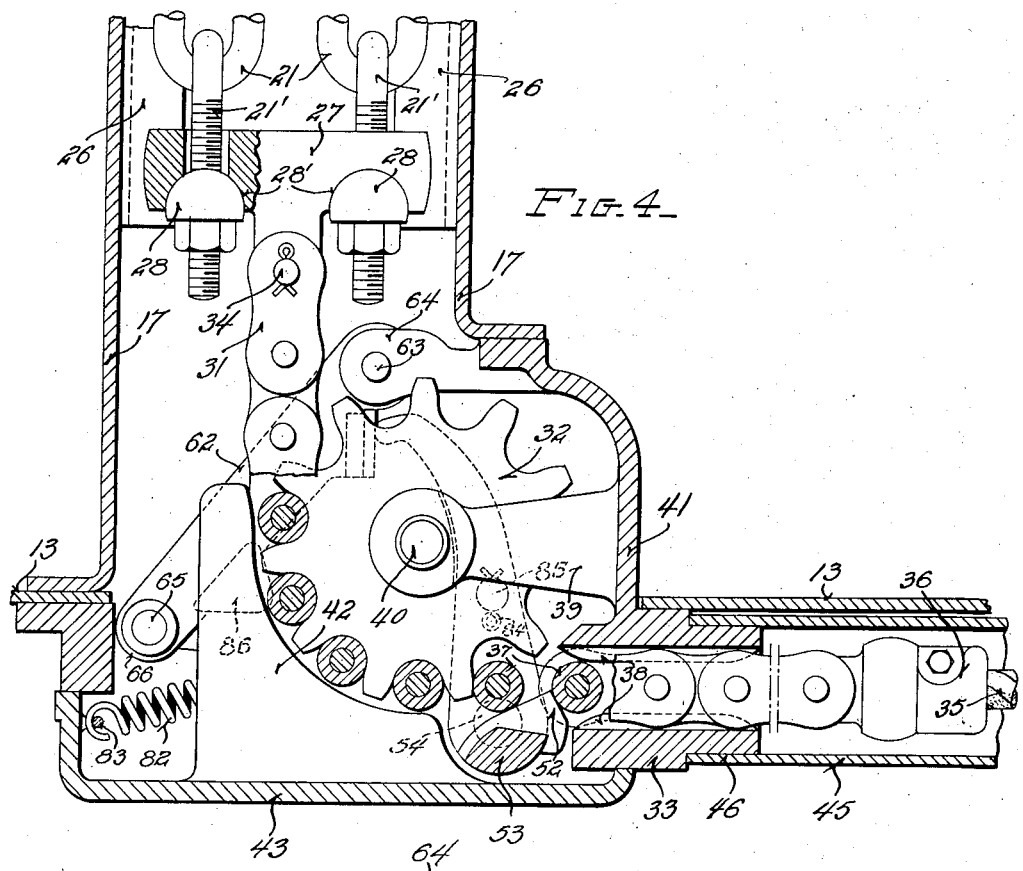
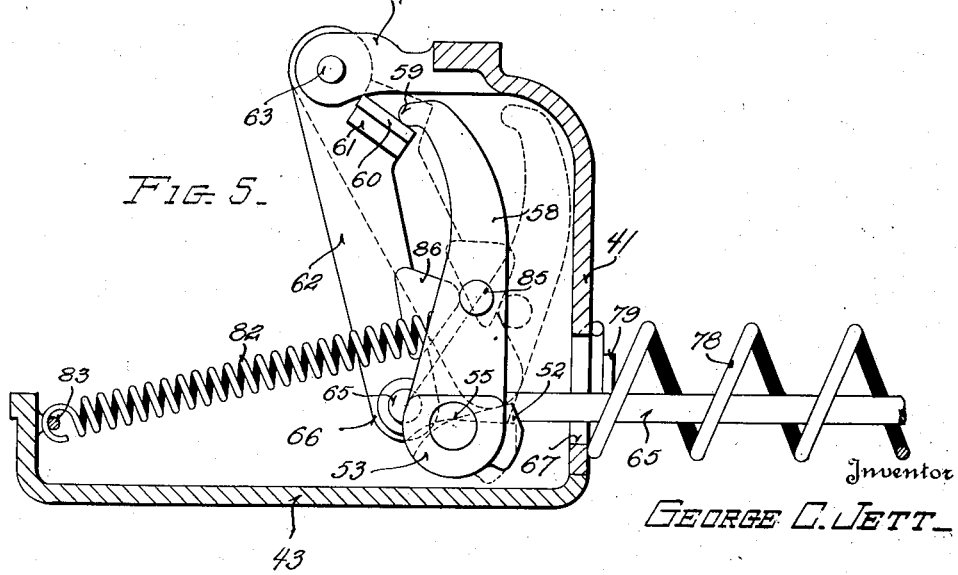

Inventor
GEORGE C. JETT
By Ralph Brown.
Attorney

Patented Dec. 18, 1934

1,984,876

UNITED STATES PATENT OFFICE 1,984,876

TRAILER DUMP MECHANISM

George C. Jett, Milwaukee, Wis., assignor of two-fifths to Walter H. Stiemke, Milwaukee, Wis.

Application March 19, 1930, Serial No. 436,965

10 Claims. (Cl. 298—35)

This invention relates to dump mechanisms primarily for use in tractor-trailer hauling units of the type described in my copending application Serial No. 268,119, filed April 7, 1928, although other uses are contemplated.

One object of the present invention is the provision of a dump mechanism for trailers which may be readily operated and controlled from the the tractor and thereby make possible the elimination from the trailer of the special attendant heretofore required to operate the dump mechanisms of the types in general use. When equipped with the dump mechanism of the present invention only one man is required to manage and operate the entire hauling unit.

A more specific object is the provision in a dump mechanism of an improved combination and arrangement of parts for more effectively and expeditiously operating the dump doors.

Another object is the provision in a dump mechanism of improved means for releasing the doors for dumping purposes.

Other more specific objects and advantages will appear from the following description of a dump mechanism constructed in accordance with the present invention.

In the drawings:—

Figure 1 is a fragmentary view in side elevation of a tractor-trailer hauling unit equipped with a dump mechanism embodying the present invention.

Fig. 2 is a transverse sectional view of the trailer, on a somewhat larger scale, taken along the line 2—2 of Fig. 1.

Fig. 3 is a sectional view taken substantially along the line 3—3 of Fig. 2.

Fig. 4 is an enlarged detail view in plan of a part of the dump operating mechanism.

Fig. 5 is a similar view of the latch mechanism partially shown in Fig. 4, illustrating two other characteristic positions thereof.

Figure 6:
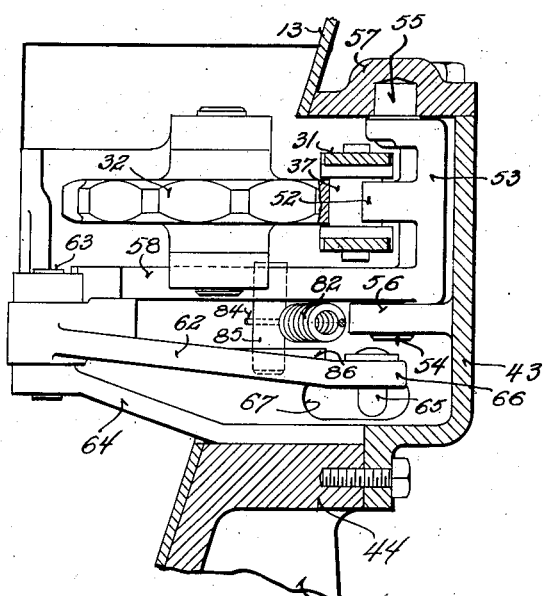
Fig. 6 is a view in side elevation of the active parts shown in Fig. 4.

The hauling unit shown in Fig. 1 is of the type described in the application hereinabove identified and includes a tractor 10, connected to and supporting the tongue 11 of a trailer 12 through a flexible and separable hitch 11'. The trailer shown is fully described in my copending application Serial No. 436,964, filed March 19, 1930. The body portion thereof comprises side and end walls 13 and 14 formed of sheet steel and welded to top and bottom frames formed of tubular members 15 and 16, respectively. The body portion is braced by a hollow sheet steel structure 17 fixed at its opposite ends to the side walls 13 intermediate the ends thereof. The body portion is supported by a pair of mounting brackets 18 externally applied to the side walls 13 adjacent the ends of the structure 17.

The bottom of the body portion is closed by a pair of bottom doors 19 carried by appropriate hangers 20 rockably supported at the sides of the body. The doors 19 are elevated and releasably retained in closed position by a pair of chains 21, each secured to one of the doors through U-bolts 22 which are removably fixed in appropriate anchor blocks 23 externally applied to the doors intermediate their ends and adjacent the abutting edges thereof. The chains extend upwardly over a pair of pulleys 24, around a second pair of pulleys 25, and then along a horizontal guide 26 to an equalizer bar 27 to which they are connected through U-bolts 21' adjustably anchored in rock bars 28 rockably seated in semi-cylindrical seats 28' formed in the equalizer bar 27 adjacent the ends thereof. Additional guides 29 and 30 retain the chains on the pulleys. The pulleys and guides are supported and completely enclosed by and within the structure 17, except that the bottom of this structure is open and thus affords access to these parts for inspection, replacement, and repair.

The equalizer bar 27 is actuated and controlled by a sprocket chain 31 which passes around a sprocket wheel 32 and through a tubular guide 33. One end of the sprocket chain is connected to the equalizer bar 27 through a pin 34 and the other end is similarly connected to an operating cable 35 through an appropriate clamp 36. The sprocket chain is of standard construction and is equipped with the usual transverse rollers 37 for engagement with and between the teeth of the sprocket wheel. The tubular guide 33 is internally fashioned to provide a sliding fit for the chain and contains a pair of longitudinal ribs 38 between which the rollers 37 are closely guided. The sprocket wheel 32 is mounted between a pair of bracket arms 39 and upon a vertical pivot pin 40 removably fixed in said arms. The arms 39, one of which is shown particularly in Fig. 4, are formed integral with one part 41 of a housing which also supports the guide 33. An internal projection 42 formed integral with another part 43 of the housing cooperates with the sprocket wheel to provide an additional guide for the sprocket chain. The part 43 of the housing is removably fixed to the upper portion 44 of one of the mounting brackets 18 and cooperates with the other housing part 41 and with the structure 17 to enclose the sprocket wheel and associated parts to thereby exclude foreign matter therefrom. The protection thus afforded to the sprocket wheel and associated parts is of importance in a hauling unit for handling dirt and other loose materials. This housing projects through an opening in the side wall 13 of the body portion, part 41 thereof being fixed to this side wall and to the structure 17 a portion of which is also cut away to accommodate the housing. A large portion of the cable 35 is also housed within a tube 45 seated at one end on the reduced end 46 of the guide 33 and at its forward end in a tubular fitting 47 fixed to the front corner of the body portion. This tube 45 serves not only as a guide and partial enclosure for the cable 35 but also prevents entry of foreign matter to the housing through the guide 33.

Figure 8:
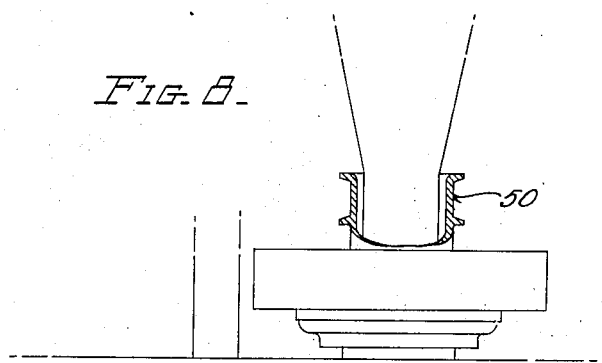
Fig. 8 is a plan view of that limited portion of the tractor to which the operating winch, shown in Fig. 1, is applied.

When not in use the free end of the cable 35 is supported by wrapping around a holder in the form of a pulley 48 fixed to the trailer tongue 11 rearwardly of but within convenient reach of the attendant on the driver's seat 49 of the tractor. To lift the bottom doors 19 from the open dotted line position into the closed full line position of Fig. 2, the attendant removes the free end of the cable 35 from the pulley 48 and loops it once about the constantly rotating winch 50 (Figs. 1 and 8) on the drive shaft 51 of the tractor, and by drawing it tightly about the winch utilizes the rotation thereof to draw the cable forwardly through the tube 45. This motion of the cable is transmitted through the sprocket chain 31, cross-head 27, and chains 21 to thereby lift the doors into closed position against the bottom of the body of the trailer. The frictional engagement of the cable 35 upon the winch 50 permits slippage therebetween to avoid breakage when the doors reach closed position. The looping of the cable about the winch is a simple process, the cable being cast onto the winch by the attendant who then catches the free end of the cable as it is whipped thereabout by the cast.

The doors are releasably retained in closed position by a latch mechanism preferably such as will now be described, reference being made particularly to Figs. 4, 5 and 6. The latch mechanism shown includes a pawl 52 which normally projects into the path of the sprocket chain 31, adjacent the inner end of guide 33, and cooperating with the chain rollers 37 to normally latch the chain against movement toward the left (Fig. 4). The pawl 52 constitutes an integral part of an upright rocker element 53 supported by vertical trunnions 54 and 55 preferably formed integral therewith. The lower trunnion 54 is journaled in a bracket lug 56 projecting inwardly from the housing part 43 while the upper trunnion is journaled in a cover piece 57 removably fixed to the top of the housing part 43. It will be noted from an inspection of Fig. 6 that the trunnions 54 and 55 are coaxial, that they are disposed below and above the chain 31, and that the body portion of the rocker element 53 is eccentric or laterally offset with respect to the axis of the trunnions in such direction as to clear the chain. It will of course be understood that the common axis of the trunnions constitutes the axis about which the pawl 52 may swing, and by the peculiar construction just described, this axis may be positioned within or closely adjacent the chain, permitting the use of a relatively short and easily actuated pawl.

Figure 7:
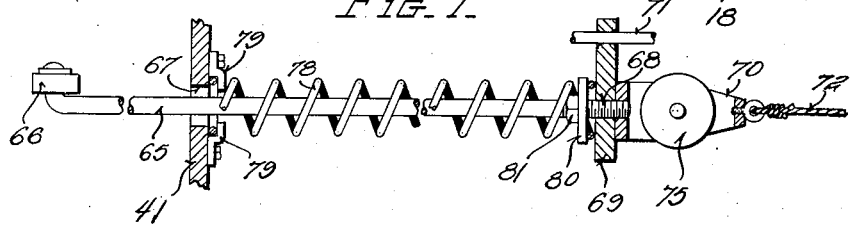
Fig. 7 is a view in side elevation of the trip rod and associated parts partially shown in Fig. 5.

The lower end of the rocker element carries an integral arm 58 having a curved end 59 arranged to bear against a wear plate 60 removably fixed to an abutment lug 61 adjacent the pivoted end of a lever 62. The lever 62 is supported to swing upon an upright pivot pin 63 removably fixed in a bracket 64 projecting inwardly from the housing part 41. The lever 62 is actuated by a rod 65 pivotally connected to the free end 66 thereof, and projecting through an opening 67 in the housing part 41, the forward end 68 of the rod being threaded into a slide plate 69 and pulley block 70. The plate 69 is perforated to slidably receive a guide rail 71. fixed to the tube 45, by which the plate and rod are supported. A trip cable 72, secured at one end to the pulley block 70, passes around a pulley 73, supported by a bracket 74 fixed to the body of the trailer, around a pulley 75 in the block 70, and through an eye 76 fixed on the body, the free end of the cable 72 when not in use being supported by wrapping around a pulley 77 fixed to the tongue 11 adjacent the pulley 48. The lever 62 is yieldably retained in the retracted position of Fig. 4 by a tension spring 78 surrounding the rod 65, one end of the spring being fixed to the housing part 41 by a pair of clamp lugs 79 (Fig. 7) and the other end being fixed to the plate 69 by a washer 80 and nut 81 threaded on the rod. The arm 58 is also yieldably retained in the position shown in Fig. 4 by a tension spring 82 having one end engaged with a pin 83 fixed in the housing and its other end engaged with a cotter pin 84 removably fixed in a stud 85 fixed in and depending from an intermediate portion of the arm 58. In this position of the arm 58 the free end 59 thereof bears against the plate 60 on lever 62 and pawl 52 is interlocked with one of the chain rollers 37.

It will be noted that this compound lever system, including the arm 58 and lever 62, together with the above described multi-part reaving of the trip cable 72 provides an operating connection for the pawl 52 affording a mechanical advantage of a very high order. The importance of this is appreciated when one considers the fact that the entire contents of the trailer body is supported by the doors 19 and that the pawl 52 is under heavy load since it alone retains the doors in closed position. The high mechanical advantage thus provided makes it relatively easy for the attendant to withdraw the pawl 52 into load releasing position by a pull upon the trip cable 72. In order to reduce the extent of the pull required so that complete release may be effected by a single stroke of the attendant, provision is made for automatically and materially reducing the mechanical advantage after the pawl has been dislodged from its full latching position. This is accomplished in this instance by the use of a lug 86 on an intermediate portion of the lever 62 so arranged as to strike the stud 35 on arm 58 when the lever 62 reaches the position shown in full lines in Fig. 5. During initial movement of the lever 62 from the position of Fig. 4 into the full line position of Fig. 5, the plate 60, acting on the end 59 of arm 58, dislodges the pawl 52 from its full latching position and shifts it into the intermediate position shown from which position it is more readily moved into released position. Thereafter during continued movement of the lever 62, the arm 58 and pawl 52 are swung into the dotted line position of Fig. 5 by the action of lug 86 on the stud 85 to thereby completely release the sprocket chain and permit the doors to lower into the open position shown in dotted lines in Fig. 2. During this coaction between the lug 86 and stud 85 a relatively short movement of the lever 62 rod 65 and trip cable 72 is sufficient to thus completely release the pawl.

From the foregoing it will be noted that simple, inexpensive, and yet effective means have thus been provided which may be readily operated by cables or other flexible tension transmitting means to operate and control the dump doors of a dirt hauling trailer, so that the same may be readily manipulated by a man on a tractor. By the use of cable operated dump control mechanisms of the character described two or more trailers coupled in train to a single tractor may be readily and independently controlled from the tractor through cables leading thereto.

Various changes may be made in the embodiment of the invention hereinabove specifically described without departing from or sacrificing the advantages of the invention as defined in the appended claims.

I claim:—

1. In a hauling unit the combination of a vehicle having a body for receiving loose materials, doors hinged to said body for closing the bottom thereof, means including a chain for lifting said doors into closed position, a pawl engageable with said chain for releasably retaining said doors in closed position, means for restraining that portion of said chain adjacent said pawl against lateral displacement to thereby insure coacting relation therebetween and a compound lever system for shifting said pawl out of engagement with said chain to thereby permit said doors to open.

2. In a hauling unit the combination of a vehicle having a body for receiving loose materials, doors for closing the bottom thereof, means including a chain for lifting said doors into closed position, rollers on said chain, a pawl engageable with said rollers for releasably retaining said doors in closed position, and a compound lever system for operating said pawl.

3. In a hauling unit the combination of a vehicle having a body for receiving loose materials, doors for closing the bottom of said body, means including a chain for lifting said doors into closed position, means for retaining said chain against transverse displacement, rollers on said chain, a pawl beside said chain coacting with said rollers to releasably retain said doors in closed position, and a compound lever system for operating said pawl.

4. In a hauling unit the combination of a vehicle having a body for receiving loose materials, doors for closing the bottom of said body, means including a chain for lifting said doors into closed position, rollers on said chain, and a pawl engageable with said rollers for releasably retaining said doors in closed position.

5. In a hauling unit the combination of a vehicle having a body for receiving loose materials, a pair of doors for closing the bottom of said body, a pair of flexible tension transmitting members secured to said doors respectively intermediate the ends thereof to lift the doors into closed position, guide means for said members, a sprocket chain connected to both of said members to simultaneously actuate the same, means including a sprocket wheel for guiding said chain, and latch mechanism adjacent said wheel and engageable with said chain for releasably retaining said doors in closed position.

6. In a hauling unit the combination of a vehicle having a body for receiving loose materials, a pair of doors for closing the bottom of said body, a pair of flexible tension transmitting members connected with said doors respectively for lifting the same into closed position, a chain connected with said members for simultaneously actuating the same, a pawl engageable with said chain for releasably retaining said doors in closed position, an element movable to operate said pawl, and a force intensifying connection between said element and pawl.

7. In a hauling unit the combination of a vehicle having a body for receiving loose materials, means movable to close the bottom of said body and to support the contents thereof, means for actuating said closing means into closed position, latch mechanism coacting with said actuating means for releasably supporting said closing means in closed position, an actuating element for said latch mechanism, and a compound lever system between said element and latch mechanism providing a force intensifying connection therebetween, said system including means for automatically varying the intensifying effect of said connection during actuation of said latch mechanism.

8. In a hauling unit the combination of a vehicle having a body for receiving loose materials, bottom dump doors for said body, means including a chain for operating and supporting said doors, a pawl coacting with said chain to releasably retain said doors in closed position, a rockable support for said pawl, and supporting trunnions for said support eccentrically disposed relative thereto.

9. In a hauling unit the combination of a vehicle having a body, bottom dump doors for said body, means including a chain for operating and supporting said doors, a pawl coacting with said chain to releasably retain said doors in closed position, and a support for said pawl rockable about an axis in close proximity to said chain, said support having a pawl carrying portion disposed eccentrically of said axis to thereby clear said chain.

10. In a hauling unit the combination of a vehicle having a body, bottom dump doors for said body, latch mechanism including a pawl for releasably retaining said doors in closed position, a first lever connected with said pawl for operating the same, and a second lever, said levers being mounted to swing about spaced parallel axes, said second lever having means adjacent its axis for engagement with the free end of said first lever to effect initial action of said pawl, said second lever also having means adjacent its free end for engagement with an intermediate portion of said first lever to complete the action of said pawl.

GEORGE C. JETT.